US012711687B2

(12) United States Patent
Taniguchi

(10) Patent No.: US 12,711,687 B2
(45) Date of Patent: Aug. 18, 2026

(54) INFORMATION PROCESSING DEVICE AND INFORMATION PROCESSING METHOD

(71) Applicant: SONY GROUP CORPORATION, Tokyo (JP)

(72) Inventor: Keiichiro Taniguchi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 148 days.

(21) Appl. No.: 18/559,801

(22) PCT Filed: Feb. 25, 2022

(86) PCT No.: PCT/JP2022/007803
§ 371 (c)(1),
(2) Date: Nov. 9, 2023

(87) PCT Pub. No.: WO2022/249604
PCT Pub. Date: Dec. 1, 2022

(65) Prior Publication Data

US 2024/0378786 A1 Nov. 14, 2024

(30) Foreign Application Priority Data

May 27, 2021 (JP) ................................ 2021-089402

(51) Int. Cl.
*G06T 13/40* (2011.01)
*G06F 3/01* (2006.01)

(52) U.S. Cl.
CPC .............. *G06T 13/40* (2013.01); *G06F 3/011* (2013.01)

(58) Field of Classification Search
CPC ................................ G06T 13/40; G06F 3/011
See application file for complete search history.

(56) References Cited

U.S. PATENT DOCUMENTS

2014/0152761 A1* 6/2014 Homma .................. H04N 7/15 348/14.08
2015/0078621 A1* 3/2015 Choi ....................... G06F 3/017 382/103

(Continued)

FOREIGN PATENT DOCUMENTS

JP 2020-042270 A 3/2020

OTHER PUBLICATIONS

International Search Report and Written Opinion of PCT Application No. PCT/JP2022/007803, issued on May 10, 2022, 15 pages of ISRWO.

*Primary Examiner* — Yu Chen
(74) *Attorney, Agent, or Firm* — CHIP LAW GROUP

(57) ABSTRACT

Provided is an information processing device according to an aspect of the present disclosure that includes a transmission processing unit, a reception processing unit, and a presentation processing unit. The transmission processing unit transmits, in remote communication performed between a plurality of points distant from each other, first motion information indicating a bodily motion of a user to a user at another point. The reception processing unit receives second motion information indicating a bodily motion of the user at the other point. The presentation processing unit controls, in presenting information in which a situation of the user at the other point is reproduced based on the second motion information, presentation content based on a situation in which the second motion information is acquired.

10 Claims, 9 Drawing Sheets

(56) References Cited

U.S. PATENT DOCUMENTS

| | | | | |
|---|---|---|---|---|
| 2017/0103564 | A1* | 4/2017 | Hayashida | A63F 13/56 |
| 2017/0365084 | A1* | 12/2017 | Hayashida | G06F 3/017 |
| 2018/0089880 | A1* | 3/2018 | Garrido | H04N 7/157 |
| 2018/0342091 | A1* | 11/2018 | Seibert | G06T 11/60 |
| 2021/0248803 | A1* | 8/2021 | Kojima | G06T 19/00 |
| 2021/0394054 | A1* | 12/2021 | Kanaya | A63F 13/213 |
| 2023/0164304 | A1* | 5/2023 | Sato | H04N 13/344<br>345/420 |

* cited by examiner

Figure 1:
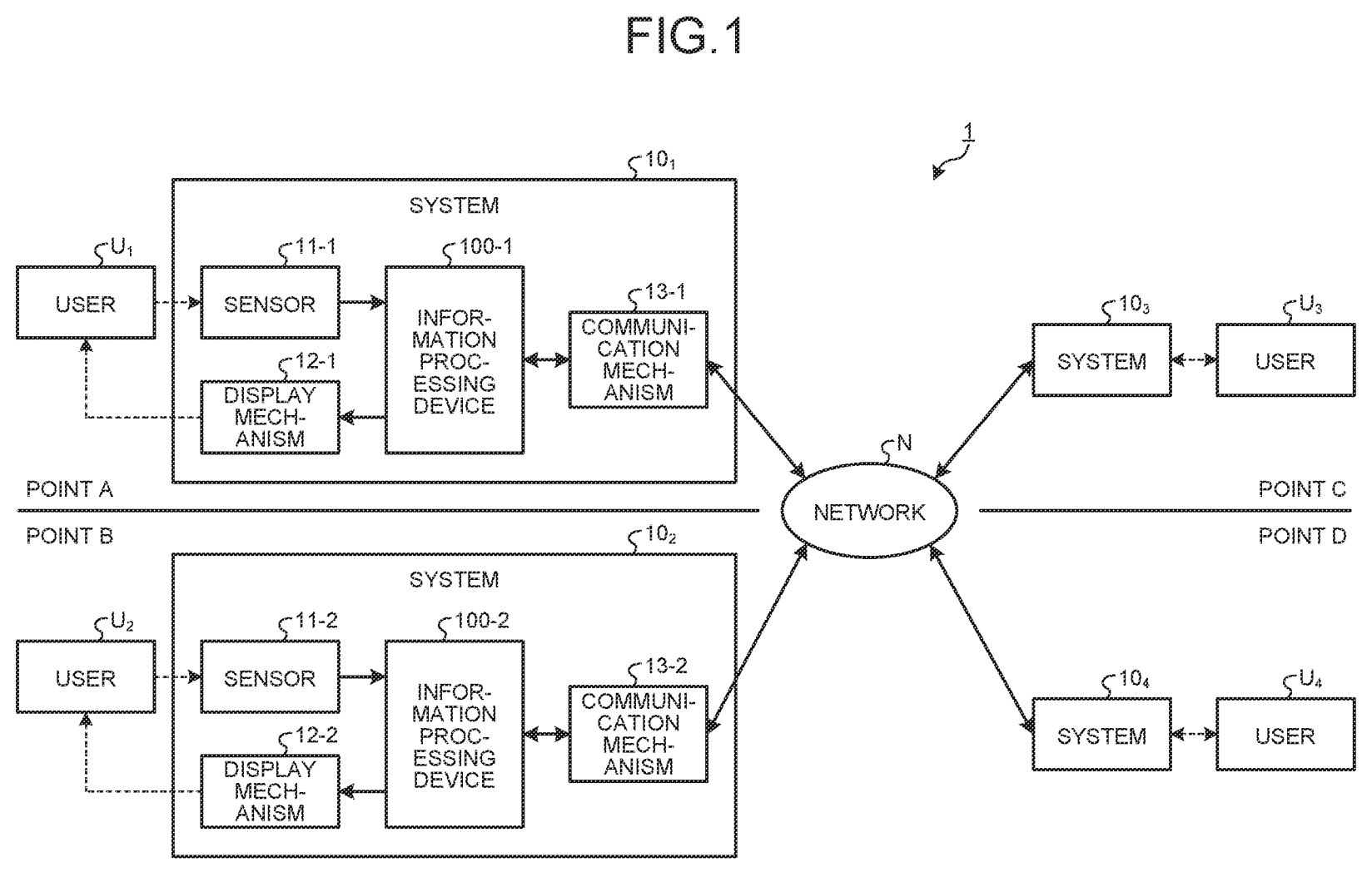

SYSTEM $10_1$: SENSOR 11-1, DISPLAY MECHANISM 12-1, INFORMATION PROCESSING DEVICE 100-1, COMMUNICATION MECHANISM 13-1

USER $U_1$

POINT A

POINT B

SYSTEM $10_2$: SENSOR 11-2, DISPLAY MECHANISM 12-2, INFORMATION PROCESSING DEVICE 100-2, COMMUNICATION MECHANISM 13-2

USER $U_2$

NETWORK N

SYSTEM $10_3$

USER $U_3$

POINT C

POINT D

SYSTEM $10_4$

USER $U_4$

FIG.5

| | ELEMENTS | CONTENTS | EXTENT | | | EXPLANATION |
|---|---|---|---|---|---|---|
| VI-SION | DISPLAY FORM | CATEGORY | REAL-TIME IMAGE | LIVE-ACTION MODEL | AVATAR | WHICH FORM IS USED TO DISPLAY MODEL OF PARTNER? |
| | RESOLUTION | APPEARANCE DATA AMOUNT | HIGH | MEDIUM | LOW | RESOLUTION IN MODEL OF PARTNER |
| | SIZE | DIMENSION | LIFE SIZE | | NON-LIFE SIZE | DIMENSION OF MODEL OF PARTNER |
| | THREE-DIMENSIONAL | THREE-DIMENSIONAL INFORMATION | BINOCULAR PARALLAX | MOTION PARALLAX | PLANE | THREE-DIMENSIONAL INFORMATION ON MODEL OF PARTNER |
| | | | | | | |
| | POSITION | THREE-DIMENSIONAL POSITION, ORIENTATION | USER INFORMATION | | AUTOMATIC ARRANGEMENT | POSITION AT WHICH TO DISPLAY MODEL OF PARTNER |
| | | | | | | |
| | FACIAL EXPRESSION | PATTERN | USER INFORMATION | AUTOMATIC COMPLEMENTATION | N/A | FACIAL EXPRESSION PATTERNS (DELIGHT, ANGER, SORROW, PLEASURE) |
| | LINE-OF-SIGHT | THREE-DIMENSIONAL POSITION | USER INFORMATION | AUTOMATIC COMPLEMENTATION | N/A | THREE-DIMENSIONAL POSITION OF EYE DIRECTION AND GAZE POINT |
| | BLINK | ON/OFF, POSITION | USER INFORMATION | AUTOMATIC COMPLEMENTATION | N/A | TIMING OF BLINKING AND EYELID MOVEMENT |
| | EYEBROW | POINT GROUP INFORMATION | USER INFORMATION | AUTOMATIC COMPLEMENTATION | N/A | SHAPE AND MOVEMENT OF EYEBROW |
| | MUSCLES OF FACIAL EXPRESSION | POINT GROUP INFORMATION | USER INFORMATION | AUTOMATIC COMPLEMENTATION | N/A | MOVEMENT OF FACE, MOVEMENT OF CHEEKS, FACE TRACKING |
| | MOUTH | POINT GROUP INFORMATION | USER INFORMATION | AUTOMATIC COMPLEMENTATION | N/A | SHAPE AND MOVEMENT OF MOUTH |
| | | | | | | |
| | BONE | POINT GROUP INFORMATION | MANY | MEDIUM | A FEW | INFORMATION ON BONES OF BODY |
| | GESTURE | CATEGORY | APPLICABLE | | N/A | CATEGORIZED GESTURE (REJOICING, HIGH-FIVING, ETC.) |
| | HEAD | THREE-DIMENSIONAL POSITION, ORIENTATION | USER INFORMATION | AUTOMATIC COMPLEMENTATION | N/A | POSITION AND ORIENTATION OF HEAD |
| | CHEST | THREE-DIMENSIONAL POSITION, ORIENTATION | USER INFORMATION | AUTOMATIC COMPLEMENTATION | N/A | POSITION AND ORIENTATION OF CHEST |
| | SHOULDER | THREE-DIMENSIONAL POSITION, ORIENTATION | USER INFORMATION | AUTOMATIC COMPLEMENTATION | N/A | POSITION AND ORIENTATION OF SHOULDER |
| | ARM | THREE-DIMENSIONAL POSITION, ORIENTATION | USER INFORMATION | AUTOMATIC COMPLEMENTATION | N/A | POSITION AND ORIENTATION OF ARM |
| | HAND | THREE-DIMENSIONAL POSITION, ORIENTATION | USER INFORMATION | AUTOMATIC COMPLEMENTATION | N/A | POSITION AND ORIENTATION OF HAND |
| | FINGER | THREE-DIMENSIONAL POSITION, ORIENTATION, POINT GROUP INFORMATION | USER INFORMATION | AUTOMATIC COMPLEMENTATION | N/A | POSITION AND ORIENTATION OF FINGER, EACH FINGER IS INDICATED AS MANY POINT GROUPS BASED ON THAT |
| | WAIST | THREE-DIMENSIONAL POSITION, ORIENTATION | USER INFORMATION | AUTOMATIC COMPLEMENTATION | N/A | POSITION AND ORIENTATION OF WAIST |
| | LEG | THREE-DIMENSIONAL POSITION, ORIENTATION | USER INFORMATION | AUTOMATIC COMPLEMENTATION | N/A | POSITION AND ORIENTATION OF ENTIRE LEG |
| | FOOT | THREE-DIMENSIONAL POSITION, ORIENTATION | USER INFORMATION | AUTOMATIC COMPLEMENTATION | N/A | POSITION AND ORIENTATION OF FOOT |

FIG.6

| | ELEMENTS | CONTENTS | EXTENT | | | EXPLANATION |
|---|---|---|---|---|---|---|
| HEARING | SOUND | SOUND INFORMATION | APPLICABLE | | N/A | VOICE, SOUND OF RUSTLING CLOTHES, MOTION SOUND INCLUDING SOUND OF SHOES |
| | SOUND SOURCE LOCATION | THREE-DIMENSIONAL POSITION | THREE-DIMENSIONAL | TWO-DIMENSIONAL | N/A | POSITION WHERE SOUND IS MADE |
| SOMATIC SEN-SATION | CONTACT | THREE-DIMENSIONAL POSITION, DEGREE OF CONTACT | USER INFORMATION | AUTOMATIC COMPLE-MENTATION | N/A | CONTACT WITH MODEL OF PARTNER |
| | SENSE OF FORCE | AMOUNT OF SENSE OF FORCE | USER INFORMATION | AUTOMATIC COMPLE-MENTATION | N/A | SENSE OF FORCE GENERATED BY CONTACT WITH MODEL OF PARTNER (PUSHING PARTNER IS POSSIBLE) |
| | SENSE OF PRESSURE | AMOUNT OF SENSE OF PRESSURE | USER INFORMATION | AUTOMATIC COMPLE-MENTATION | N/A | SENSE OF PRESSURE GENERATED BY CONTACT WITH MODEL OF PARTNER (SOFTNESS OF PARTNER) |
| | TACTILE SENSE | AMOUNT OF TACTILE SENSE | USER INFORMATION | AUTOMATIC COMPLE-MENTA-TION | N/A | TACTILE SENSE GENERATED BY CONTACT WITH MODEL OF PARTNER (TEXTURE SENSE OF PARTNER) |
| | SENSE OF WARMTH | TEMPERATURE | USER INFORMATION | AUTOMATIC COMPLE-MENTATION | N/A | SENSE OF WARMTH GENERATED BY CONTACT WITH MODEL OF PARTNER (WARMTH OF PARTNER) |
| | AIR PRESSURE | THREE-DIMENSIONAL POSITION, DEGREE | USER INFORMATION | AUTOMATIC COMPLE-MENTATION | N/A | AIR PRESSURE GENERATED BY MOVEMENT OR BREATH OF PARTNER |
| OLFAC-TION | SMELL | AMOUNT OF SMELL | USER INFORMATION | AUTOMATIC COMPLE-MENTATION | N/A | SMELL OR SCENT OF PARTNER |

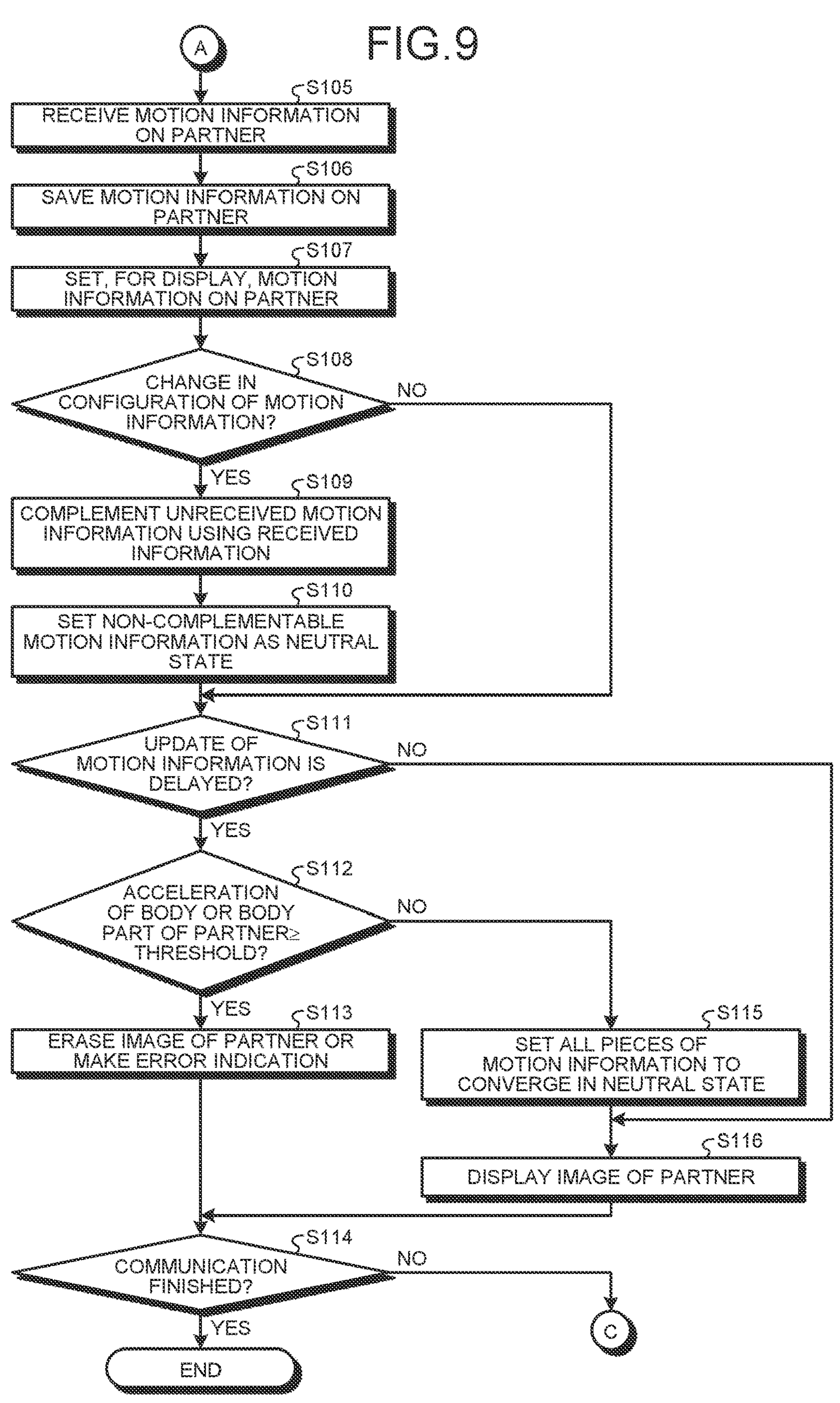
FIG.9
A
S105
RECEIVE MOTION INFORMATION ON PARTNER
S106
SAVE MOTION INFORMATION ON PARTNER
S107
SET, FOR DISPLAY, MOTION INFORMATION ON PARTNER
S108
CHANGE IN CONFIGURATION OF MOTION INFORMATION?
NO
YES
S109
COMPLEMENT UNRECEIVED MOTION INFORMATION USING RECEIVED INFORMATION
S110
SET NON-COMPLEMENTABLE MOTION INFORMATION AS NEUTRAL STATE
S111
UPDATE OF MOTION INFORMATION IS DELAYED?
NO
YES
S112
ACCELERATION OF BODY OR BODY PART OF PARTNER≥ THRESHOLD?
NO
YES
S113
ERASE IMAGE OF PARTNER OR MAKE ERROR INDICATION
S115
SET ALL PIECES OF MOTION INFORMATION TO CONVERGE IN NEUTRAL STATE
S116
DISPLAY IMAGE OF PARTNER
S114
COMMUNICATION FINISHED?
NO
YES
END
C

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2022/007803 filed on Feb. 25, 2022, which claims priority benefit of Japanese Patent Application No. JP 2021-089402 filed in the Japan Patent Office on May 27, 2021. Each of the above-referenced applications is hereby incorporated herein by reference in its entirety.

FIELD

The present disclosure relates to an information processing device, an information processing method, and an information processing program.

BACKGROUND

Conventionally, there is known a conference system, a communication tool, and the like for achieving so-called remote communication in which communication is performed between a plurality of points distant from each other while an image of a communication partner is displayed by transmitting and receiving an image and a sound to and from each other.

Further, in recent years, with the development of so-called XR technologies such as virtual reality (VR) and augmented reality (AR), platforms for remote communication using XR devices have also begun to appear. According to the remote communication using an XR device, not only linguistic information but also various kinds of information other than the linguistic information can be conveyed, which makes it possible to achieve a sense of coexistence as if a conversation is held in a real space.

Further, in response to diversification of information transmitted and received via a network, for example, a data processing system has been proposed for identifying the optimal transmission modality for data/packet transmission in a voice-activated computer network environment.

CITATION LIST

Patent Literature

Patent Literature 1: JP 2020-42270 A

SUMMARY

Technical Problem

However, in the foregoing remote communication, due to an increase in the amount of information to be transmitted and received, the remote communication is likely to be affected by change in a communication band or a communication delay, which sometimes makes it difficult to smoothly perform communication.

In light of the above, the present disclosure proposes an information processing device, an information processing method, and an information processing program that enable remote communication to be smoothly performed.

Solution to Problem

To solve the above problem, an information processing device that provides a service that requires an identity verification process according to an embodiment of the present disclosure includes: a transmission processing unit configured to transmit, in remote communication performed between a plurality of points distant from each other, first motion information indicating a bodily motion of a user to a user at another point; a reception processing unit configured to receive second motion information indicating a bodily motion of the user at said another point; and a presentation processing unit configured to control, in presenting information in which a situation of the user at said another point is reproduced based on the second motion information, presentation content based on a situation in which the second motion information is acquired.

BRIEF DESCRIPTION OF DRAWINGS

FIG. 1 is a diagram illustrating an example of the configuration of an information processing system according to an embodiment of the present disclosure.

FIG. 5 is a diagram illustrating an example of motion information according to an embodiment of the present disclosure.

FIG. 6 is a diagram illustrating an example of motion information according to an embodiment of the present disclosure.

FIG. 9 is a flowchart illustrating an example of a processing procedure of an information processing device according to an embodiment of the present disclosure.

DESCRIPTION OF EMBODIMENTS

Figure 2:
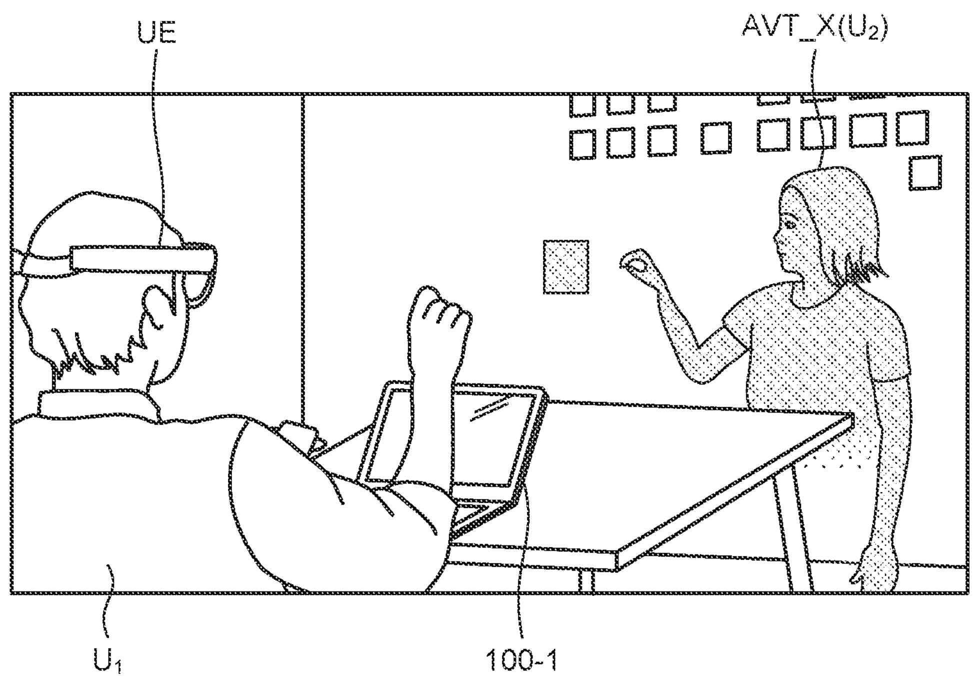
FIG. 2 is a diagram illustrating an example of a usage scene of remote communication according to an embodiment of the present disclosure.

Hereinafter, embodiments of the present disclosure are described in detail with reference to the drawings. In the embodiments described below, constituent elements having substantially the same functional configuration are denoted with the same numbers or reference numerals, and repeated explanation of these structural elements is sometimes omitted. Further, in the specification and the drawings, a plurality of constituent elements having substantially the same functional configuration is sometimes distinguished from one another and described by adding different numbers or reference numerals after the same number or reference numeral.

Further, the present disclosure is described in the following order of items.

1. Embodiment
1-1. System configuration example
1-2. Example of usage scene
1-3. Device configuration example
1-3-1. Regarding motion information
1-3-2. Regarding priority order of motion information
1-3-3. Regarding neutral state
1-3-4. Specific example of display control
1-4. Processing procedure example
2. Modification
2-1. Regarding priority order
2-2. Use of regular motion pattern
2-3. Conditions for transmitting motion information
2-4. Regarding update of information
2-5. Regarding complement of information
2-6. Regarding neutral state
2-7. Regarding display of communication partner
3. Others
4. Hardware configuration example
5. Conclusion

1. Embodiment

<1-1. System Configuration Example>

Hereinafter, a configuration of an information processing system 1 according to an embodiment of the present disclosure will be described with reference to FIG. 1. FIG. 1 is a diagram illustrating an example of the configuration of an information processing system according to the embodiment of the present disclosure.

As illustrated in FIG. 1, the information processing system 1 according to the embodiment includes a plurality of systems 10 installed at points distant from each other. In the example illustrated in FIG. 1, the information processing system 1 includes a system $\mathbf{10}_1$ installed at point A, a system $\mathbf{10}_2$ installed at point B, a system $\mathbf{10}_3$ installed at point C, and a system $\mathbf{10}_4$ installed at point D. Note that the information processing system 1 illustrated in FIG. 1 may include more systems than the example illustrated in FIG. 1, or may include less systems than the example illustrated in FIG. 1.

The systems $\mathbf{10}_1$ to $\mathbf{10}_4$ illustrated in FIG. 1 are connected to a network N. The systems $\mathbf{10}_1$ to $\mathbf{10}_4$ illustrated in FIG. 1 can perform communication with each other via the network N. The network N may include a public line network such as the Internet, a telephone line network, or a satellite communication network, various local area networks (LANs) including Ethernet (registered trademark), and a wide area network (WAN). The network N may also include a dedicated line network such as an Internet protocol-virtual private network (IP-VPN). The network N may also include a wireless communication network such as Wi-Fi (registered trademark) and Bluetooth (registered trademark).

The system $\mathbf{10}_1$ illustrated in FIG. 1 is used by a user $U_1$. The system $\mathbf{10}_2$ illustrated in FIG. 1 is used by a user $U_2$. The system $\mathbf{10}_3$ illustrated in FIG. 1 is used by a user $U_3$. The system $\mathbf{10}_4$ illustrated in FIG. 1 is used by a user $U_4$. In the following description, in a case where it is not necessary to particularly distinguish and describe the system $\mathbf{10}_1$, the system $\mathbf{10}_2$, the system $\mathbf{10}_3$, and the system $\mathbf{10}_4$, they will be collectively referred to as a "system 10".

In the example illustrated in FIG. 1, the systems $\mathbf{10}_1$ to $\mathbf{10}_4$ have configurations similar to each other. For example, the system $\mathbf{10}_1$ includes a sensor 11-1, a display mechanism 12-1, a communication mechanism 13-1, and an information processing device 100-1. Similarly, the system $\mathbf{10}_2$ includes a sensor 11-2, a display mechanism 12-2, a communication mechanism 13-2, and an information processing device 100-2. Although not illustrated, each of the system $\mathbf{10}_3$ and the system $\mathbf{10}_4$ includes a sensor 11, a display mechanism 12, a communication mechanism 13, and an information processing device 100. The system 10 illustrated in FIG. 1 may have a configuration different from that of the example illustrated in FIG. 1.

Note that, in the following description, in a case where it is not necessary to distinguish and describe the sensor 11-1 and the sensor 11-2, they will be collectively referred to as a "sensor 11". In addition, in the following description, in a case where it is not necessary to particularly distinguish and describe the display mechanism 12-1 and the display mechanism 12-2, they will be collectively referred to as a "display mechanism 12". Further, in the following description, in a case where it is not necessary to particularly distinguish and describe the communication mechanism 13-1 and the communication mechanism 13-2, they will be collectively referred to as a "communication mechanism 13". Further, in the following description, in a case where it is not necessary to particularly distinguish and describe the information processing device 100-1 and the information processing device 100-2, they will be collectively referred to as an "information processing device 100".

Each of the systems $\mathbf{10}_1$ to $\mathbf{10}_4$ illustrated in FIG. 1 enables processing related to remote communication performed between a plurality of points distant from each other by the foregoing units.

The sensor 11 included in the system 10 senses a state of a user U of the system 10. The sensor 11 includes a plurality of devices that sense the state of the user U. For example, it is possible that the sensor 11 includes a microphone, a camera, a tilt sensor, a range sensor, a posture sensor, a position sensor, a self-position estimation sensor, and a pressure sensor.

Specifically, the tilt sensor is implemented by an acceleration sensor or the like. The range sensor is implemented by various distance sensor modules of a time of flight (ToF) system or the like. The posture sensor, the position sensor, or the self-position estimation sensor is implemented by an inertial measurement unit (IMU), a global positioning system (GPS), a light detection and ranging (LiDAR), or the like. The pressure sensor is implemented by an arbitrary pressure sensor such as a gauge type, a capacitive type, or a mechanical type.

Further, in addition to the various sensors described above, the sensor 11 may include a human detection sensor, a temperature sensor, a humidity sensor, an illuminance sensor, a proximity sensor, and a biometric sensor that detects biometric information such as a smell, sweat, heartbeat, pulse, and brain wave. Further, the sensor 11 may include an environment installation sensor such as a depth sensor.

The sensor 11 can acquire a voice of the user U or the like. The sensor 11 can also acquire information such as a standing position, a head position, a hand position, and a posture of the user U. The sensor 11 can also acquire information about a line-of-sight and facial expressions of the user U. The sensor 11 can also acquire a whole-body image of the user U. The sensor 11 can acquire information about contact by the user U. In acquiring various types of information, the sensor 11 can use a plurality of sensors in combination. The sensor 11 transmits the acquired information about the user U to the information processing device 100.

The display mechanism 12 displays visual information regarding a user at another point that is a communication partner (any of the users U, for example). Further, the display mechanism 12 outputs various types of information such as voice information of a user at another point that is a communication partner (any of the users U, for example). The display mechanism 12 is implemented by a speaker, headphones, an XR device, various display devices, a projector, a vibrator, a haptics device, or the like. The XR device includes a head-mounted display for VR, AR glasses, and a video see-through AR display device. The AR display device includes a smartphone and a tablet terminal. Further, the various display devices may be implemented by a display device mounted on an information device such as a smartphone, a tablet, a television receiver, or a personal computer.

The communication mechanism 13 performs network communication via the network N. The communication mechanism 13 is implemented by a communication device or the like for connecting to the network N. The communication mechanism 13 is implemented by, for example, a communication card for wired local area network (LAN), wireless LAN, long term evolution (LTE), Wi-Fi (registered trademark), infrared communication, Bluetooth (registered trademark), or wireless USB (WUSB). The communication mechanism 13 may be implemented by a router for optical communication, a modem for various types of communication, or the like.

The information processing device 100 executes various processing related to remote communication performed between a plurality of points distant from each other. The information processing device 100 is implemented by a desktop or laptop personal computer (PC), a smartphone, a tablet terminal, a personal digital assistant (PDA), or the like. Incidentally, the information processing device 100 may be implemented by a server device or a cloud system.

<1-2. Example of Usage Scene>

Hereinafter, an example of a usage scene of remote communication achieved by the information processing system 1 according to the embodiment of the present disclosure will be described. FIG. 2 is a diagram illustrating an example of a usage scene of remote communication according to the embodiment of the present disclosure.

Figure 3:
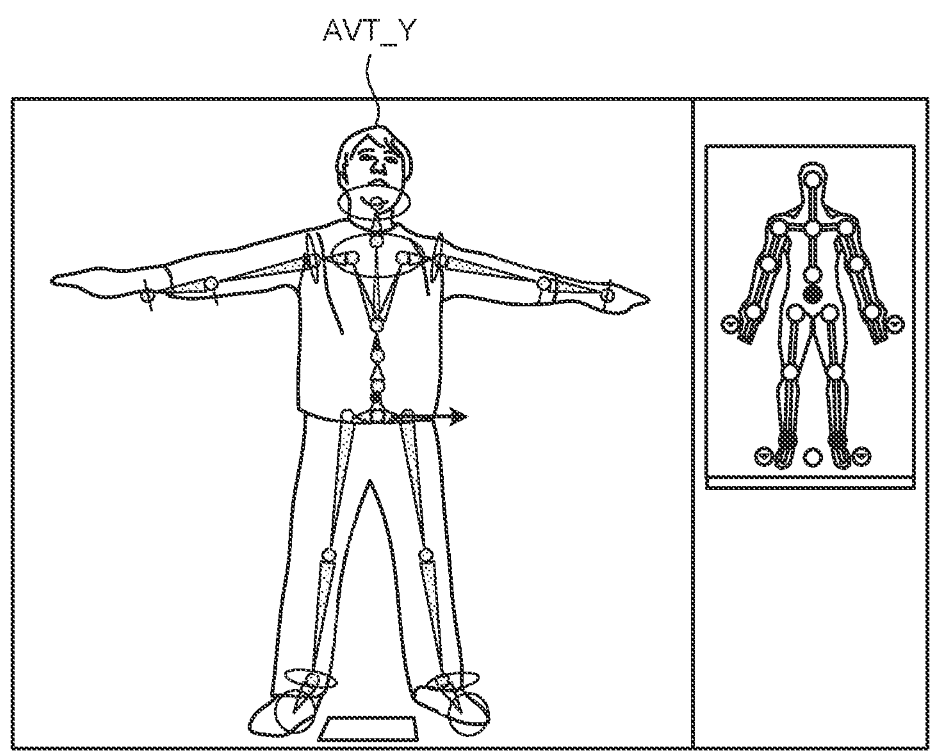
FIG. 3 is a diagram illustrating an example of a presentation object according to an embodiment of the present disclosure.

As illustrated in FIG. 2, for example, the information processing device 100-1 used by the user $U_1$ can virtually display a three-dimensional avatar AVT_X that a user at point B (user $U_2$) as a communication partner uses as the user himself/herself, in the real space through an XR device UE (AR glasses, for example) worn by the user $U_1$. An object that can be presented in the remote communication by the information processing system 1 according to the embodiment of the present disclosure is not limited to the virtual avatar. FIG. 3 is a diagram illustrating an example of a presentation object according to the embodiment of the present disclosure.

As illustrated in FIG. 3, in the information processing system 1 according to the embodiment of the present disclosure, not only a virtual three-dimensional avatar (see FIG. 2, for example) but also a photorealistic avatar AVT_Y can be generated based on information for reproducing the communication partner and virtually displayed in the real space.

In the case of FIGS. 2 and 3, each of the systems 10 constituting the information processing system 1 mutually transmits and receives information for reproducing a person (voice, hand position, line-of-sight, facial expression, standing position, head orientation, and so on) to and from another system 10. The information for reproducing a person is acquired by an XR device worn by the user U of each system 10 (see FIG. 1) or an environment installation sensor such as the depth sensor included in the sensor 11.

In the examples illustrated in FIGS. 2 and 3, while the remote communication is being performed, the user at another point as the communication partner is displayed as a three-dimensional avatar AVT whose posture can be changed by bones. Model information on the three-dimensional avatar AVT is stored in advance in the XR device worn by the user U of each system 10 that performs remote communication in advance. In a case where a 360-degree whole-body image of the communication partner can be transmitted and received, the texture of the three-dimensional avatar AVT may be a real-time image.

<1-3. Device Configuration Example>

Figure 4:
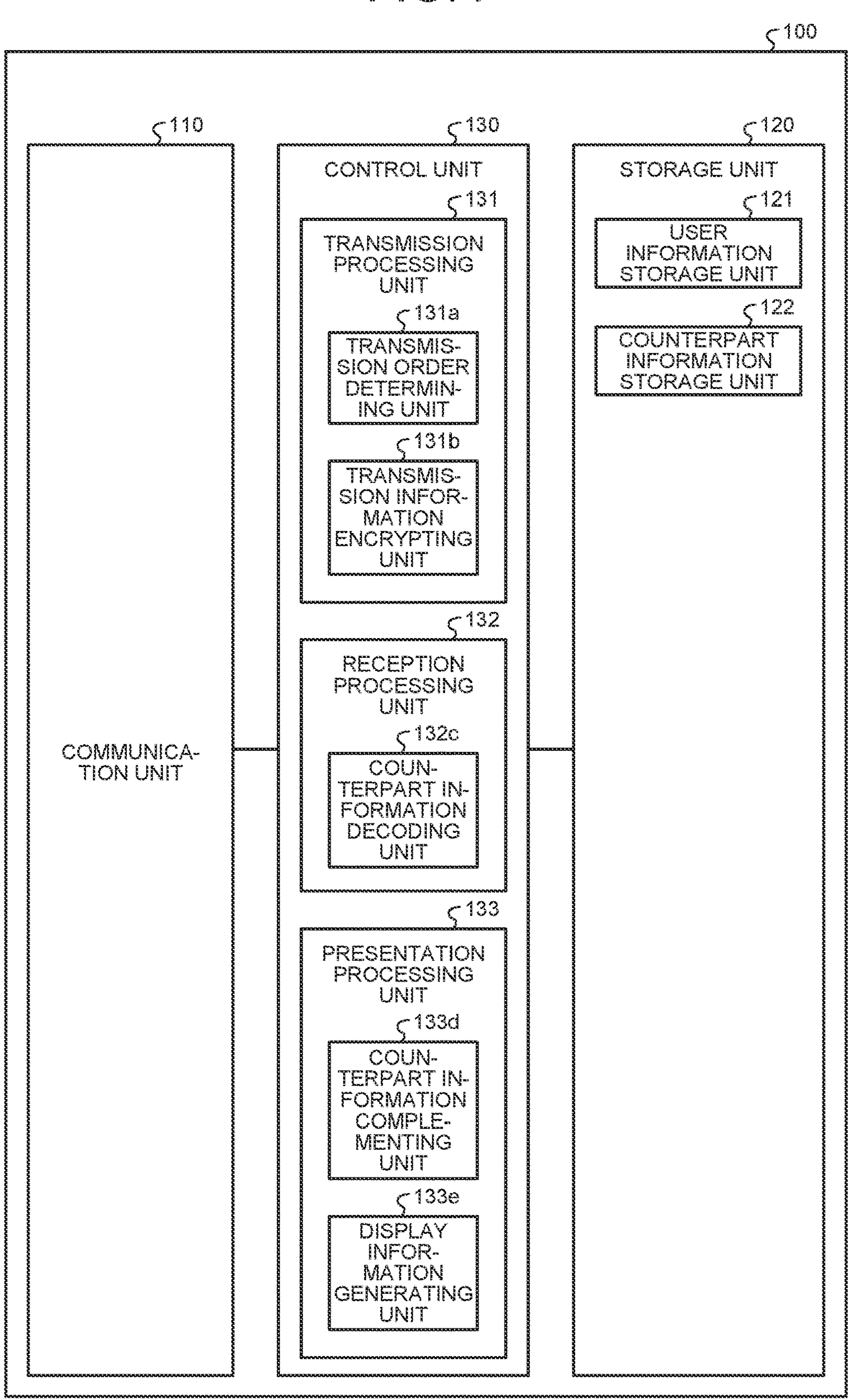
FIG. 4 is a block diagram illustrating an example of the device configuration of an information processing device according to an embodiment of the present disclosure.

Hereinafter, the device configuration of the information processing device 100 according to the embodiment of the present disclosure will be described with reference to FIG. 4. FIG. 4 is a block diagram illustrating an example of the device configuration of the information processing device according to the embodiment of the present disclosure.

As illustrated in FIG. 4, the information processing device 100 includes a communication unit 110, a storage unit 120, and a control unit 130. FIG. 4 illustrates an example of the functional configuration of the information processing device 100 according to the embodiment, and the functional configuration is not limited to the example illustrated in FIG. 4, and another configuration may be used.

The communication unit 110 transmits and receives various types of information. The communication unit 110 is implemented by a communication module for transmitting and receiving data to and from another system 10 through the communication mechanism 13 in a wired or wireless manner. The communication unit 110 performs communication with other devices by a method such as wired local area network (LAN), wireless LAN, Wi-Fi (registered trademark), infrared communication, Bluetooth (registered trademark), near field communication, or non-contact communication.

For example, the communication unit 110 receives, from another system 10, motion information such as a voice of a communication partner for remote communication. Further, the communication unit 110 transmits, to another system 10, motion information such as a voice of the user U acquired by the sensor 11.

The storage unit 120 is implemented by, for example, a semiconductor memory device such as a random access memory (RAM) or a flash memory, or a storage device such as a hard disk or an optical disk. The storage unit 120 can store programs, data, and the like for enabling various processing functions executed by the control unit 130, for example. The programs stored in the storage unit 120 include an operating system (OS) and various application programs.

For example, as illustrated in FIG. 4, the storage unit 120 includes a user information storage unit 121 and a counterpart information storage unit 122.

The user information storage unit 121 stores the motion information such as a voice of the user U acquired by the sensor 11. The user information storage unit 121 can store the motion information on the user U in time series in association with, for example, a time stamp or a priority order to be described later.

The counterpart information storage unit 122 stores the motion information such as a voice of a communication partner for remote communication. The user information storage unit 121 can store the motion information on the communication partner in time series in association with, for example, a time stamp or a priority order to be described later.

The control unit 130 is implemented by a control circuit including a processor and a memory. The various processing executed by the control unit 130 are enabled, for example, by executing a command described in a program read from an internal memory by a processor using the internal memory as a work area. The programs read by the processor from the internal memory include an operating system (OS) and an application program. Alternatively, the control unit 130 may be implemented, for example, by an integrated circuit such as an application specific integrated circuit (ASIC), a field-programmable gate array (FPGA), or a system-on-a-chip (SoC).

Further, a main storage device or an auxiliary storage device functioning as the internal memory is implemented by, for example, a semiconductor memory device such as a random access memory (RAM) or a flash memory, or a storage device such as a hard disk or an optical disk.

As illustrated in FIG. 4, the control unit 130 includes a transmission processing unit 131, a reception processing unit 132, and a presentation processing unit 133.

In the remote communication performed between a plurality of points distant from each other, the transmission processing unit 131 transmits first motion information indicating a bodily motion of the user U to a user at another point as a communication partner. As illustrated in FIG. 4, the transmission processing unit 131 includes a transmission order determining unit 131*a* and a transmission information encrypting unit 131*b*. Note that the transmission order determining unit 131*a* and the transmission information encrypting unit 131*b* are examples of processing functions of the transmission processing unit 131. That is, it can be said that the processing executed by the transmission order determining unit 131*a* and the transmission information encrypting unit 131*b* is processing executed by the transmission processing unit 131.

The transmission order determining unit 131*a* sets a priority order that can be dynamically changed for the first motion information. For example, the transmission order determining unit 131*a* sets a priority order for each of a plurality of pieces of information constituting the first motion information. The transmission information encrypting unit 131*b* encrypts the first motion information and information on the priority order. The transmission processing unit 131 preferentially transmits the first motion information with high priority set to a user at another point. Specifically, the transmission processing unit 131 transmits the first motion information according to the priority within a range in which transmission is possible in the communication band.

The reception processing unit 132 receives second motion information indicating a bodily motion of the user at another point, who is a communication partner for the remote communication, through the communication unit 110. As illustrated in FIG. 4, the reception processing unit 132 includes a counterpart information decoding unit 132*c*. The counterpart information decoding unit 132*c* is an example of processing functions of the reception processing unit 132. That is, it can be said that the processing executed by the counterpart information decoding unit 132*c* is processing executed by the reception processing unit 132.

The counterpart information decoding unit 132*c* decodes motion information received from the user at another point that is a communication partner. Further, the reception processing unit 132 stores (saves) the received second motion information in the counterpart information storage unit 122 in order to display the received second motion information on the system 10. Further, the reception processing unit 132 transmits the received second motion information to the presentation processing unit 133.

In presenting information in which a situation of the user at another point is reproduced based on the second motion information, the presentation processing unit 133 controls the presentation content based on a situation in which the second motion information is acquired. As illustrated in FIG. 4, the presentation processing unit 133 includes a counterpart information complementing unit 133*d* and a display information generating unit 133*e*. The counterpart information complementing unit 133*d* and the display information generating unit 133*e* are examples of processing functions of the presentation processing unit 133. That is, it can be said that the processing executed by the counterpart information complementing unit 133*d* and the display information generating unit 133*e* is processing executed by the presentation processing unit 133.

For example, in a case where the configuration of the second motion information changes, the presentation processing unit 133 (counterpart information complementing unit 133*d*) controls the display content. As the change in the configuration, change in the priority order of the second motion information transmitted from the communication partner, a decrease in the type of the second motion information, and the like are assumed.

Specifically, in a case where the number of types of the second motion information received by the reception processing unit 132 is reduced, the presentation processing unit 133 complements unreceived second motion information by using received second motion information stored in the counterpart information storage unit 122. Then, the presentation processing unit 133 stores the complemented second motion information for display in the counterpart information storage unit 122. In a case where the type of the second motion information received by the reception processing unit 132 increases, the presentation processing unit 133 searches whether the unreceived second motion information can be complemented by using the increased second motion information. If the unreceived second motion information can be complemented, then the presentation processing unit 133 complements the unreceived second motion information to store the resultant for display in the counterpart information storage unit 122.

Further, if the unreceived second motion information cannot be complemented using the received second motion information, then the presentation processing unit 133 sets the non-complementable second motion information as preset information. For example, the presentation processing unit 133 stores the non-complementable second motion information, as a preset neutral state, in the counterpart information storage unit 122. As a specific example, in a case where information about the position (standing position, for example) of the communication partner is no longer received, the presentation processing unit 133 switches a stereophonic sound that is being presented to brain localization that is preset as the neutral state, and presents the same.

Further, in a case where a reception interval of the second motion information is longer than a predetermined update interval of the second motion information, that is, in a case where a communication delay occurs, the presentation processing unit 133 controls the display content.

For example, before and after the information is updated, the presentation processing unit 133 erases an image display of the user at another point in which the second motion information having a degree of movement of the second motion information greater than or equal to a predetermined threshold is reproduced, or changes the image display to an error indication. Specifically, in a case where the motion information indicating position coordinates, such as a hand position, a standing position, and a head position of the communication partner, has greatly changed until several times before the information is updated, for example, in a case where acceleration of a point corresponding to the position coordinates is a certain value or more, the presentation processing unit 133 deletes the motion display of the communication partner. Alternatively, the presentation processing unit 133 switches the motion display of the communication partner to an error indication such as a loading mark or a warning message to display the resultant.

Further, before and after the information is updated, in a case where the degree of movement of the second motion information is less than the predetermined threshold, the presentation processing unit 133 sets the image display of the user at another point in which the second motion information is reproduced as the preset information.

For example, the presentation processing unit 133 updates the motion display of the communication partner so that the motion display of the communication partner approaches a value in the neutral state. As a specific example, in a case where a communication delay occurs during a motion of raising an arm by the communication partner, the presentation processing unit 133 updates the motion display of the communication partner so as to gradually lower the position of the arm in order to bring the state closer to a state of "arm being lowered" that is preset as the neutral state.

The presentation processing unit 133 (display information generating unit 133*e*) generates display information in which a situation of the communication partner is reproduced based on various settings for the second motion information. The presentation processing unit 133 generates display information in which a voice and an image of the communication partner are synchronized with each other along a time axis. The presentation processing unit 133 transmits the generated display information from the communication unit 110 to the display mechanism 12. The display information transmitted from the presentation processing unit 133 to the display mechanism 12 is output from the display mechanism 12 to be presented to the user U.

<1-3-1. Regarding Motion Information>

Hereinafter, motion information transmitted and received between the users in the information processing system 1 according to the embodiment will be described. FIGS. 5 and 6 are diagrams illustrating an example of the motion information according to the embodiment of the present disclosure. FIGS. 5 and 6 illustrate an example of the motion information. The motion information may be information different from the information illustrated in FIGS. 5 and 6, or may include different information. In the embodiment of the present disclosure, it is not necessary to exchange all the pieces of motion information illustrated in FIGS. 5 and 6.

As illustrated in FIG. 5 or 6, the motion information includes information regarding "vision", "hearing", "somatic sensation", and "olfaction". As illustrated in FIG. 5 or 6, the information regarding "vision", "hearing", "somatic sensation", "olfaction", and the like includes a plurality of elements.

As illustrated in FIG. 5, the "vision" information includes, for example, a plurality of elements such as a display form, a position, a facial expression, and a bone of the communication partner. As illustrated in FIG. 6, the "hearing" information includes, for example, a plurality of elements such as a sound related to an utterance or a motion of the communication partner and a sound source location of a stereophonic sound provided from the communication partner. As illustrated in FIG. 6, the "somatic sensation" information includes, for example, a plurality of elements such as a contact and a sense of force by the communication partner. As illustrated in FIG. 6, the "olfaction" information includes, for example, a plurality of elements such as a contact and a sense of force by the communication partner.

Further, among the "vision" information illustrated in FIG. 5, the "display form" is a form with which to display a model of the communication partner. For example, the "display form" is selected from among categories such as a real-time image, a live-action model, and an avatar.

Further, among the "vision" information illustrated in FIG. 5, the "resolution" is resolution with which to display the model of the communication partner. For example, any one of high, medium, and low is selected as the "resolution".

Further, among the "vision" information illustrated in FIG. 5, the "size" is a dimension used in displaying the model of the communication partner. For example, either a life size or a non-life size is selected as the "size".

Further, among the "vision" information illustrated in FIG. 5, the "three-dimensional" is three-dimensional information in displaying the model of the communication partner. For example, any one of binocular parallax, motion parallax, and a plane is selected as the "three-dimensional".

Further, among the "vision" information illustrated in FIG. 5, the "position" is information about a position at which the model of the communication partner or the like is displayed, and is represented by a three-dimensional position of the partner in a coordinate system centered on an arbitrary point (hereinafter, the coordinate system is referred to as a "global coordinate system"). The information about the "position" may be configured by information about a two-dimensional position in a case where the height information is not necessary. Conversely, the information about the "position" may include only the height information.

Further, among the "vision" information illustrated in FIG. 5, the "bone" is point group information (bone information) reproduced based on key points such as joint points of the communication partner. For example, the extent of display of the "bone" is selected.

Further, among the "vision" information illustrated in FIG. 5, the "gesture" is information that is categorized in advance and indicates a gesture of the communication partner. For example, as for the "gesture", "applicable" or "not applicable" of the gesture is selected.

Further, among the "vision" information illustrated in FIG. 5, the "head" is information about a three-dimensional position and a front orientation of the head of the communication partner. The three-dimensional position may be represented in the global coordinate system, or may be represented in a coordinate system centered on the standing position (hereinafter, the coordinate system is referred to as a "local coordinate system"). Further, it is possible that the "head" information does not include information about the orientation of the head.

Further, among the "vision" information illustrated in FIG. 5, the "chest", "shoulder", "arm", "hand", "finger", "waist", "leg", and "foot" are information indicating three-dimensional positions and orientations of the positions and orientations of the chest, shoulder, arm, hand, finger, waist, leg, and foot of the communication partner, respectively. The information about each part described above may be represented in the global coordinate system, or may be represented in a system centered on the head position (hereinafter, the system is referred to as a "head coordinate system").

Each element of the "head", "chest", "shoulder", "arm", "hand", "finger", "waist", "leg", and "foot" may be integrated and handled as information for representing the posture of the communication partner in a pattern where the communication partner sits, stands, or raises one arm.

Further, among the "vision" information illustrated in FIG. 5, the "facial expression" is information for representing the facial expression of the communication partner in several patterns of emotions such as delight, anger, sorrow, and pleasure. Further, the "facial expression" information may be real-time image data obtained by photographing the face of the communication partner. In this case, the image data may be image data obtained by photographing the face of the communication partner from the front, may be image data obtained by photographing the communication partner from a plurality of directions, or may be a texture image obtained by combining a plurality of photographed images.

Further, among the "vision" information illustrated in FIG. 5, the "line-of-sight" is a three-dimensional position or vector of an eye direction or a gaze point of the communication partner, and may be represented in the global coordinate system or the local coordinate system. The "line-of-sight" may be represented by vectors of the right and left eyeballs with respect to the head coordinate system.

Further, among the "vision" information illustrated in FIG. 5, the "blink" is information regarding the movement of eyelids of the communication partner. Further, among the "vision" information illustrated in FIG. 5, the "eyebrow" is information indicating the shape or movement of the eyebrow of the communication partner.

Figure 7:
FIG. 7 is a diagram illustrating an example of acquiring information about facial muscles according to an embodiment of the present disclosure.

Further, among the "vision" information illustrated in FIG. 5, the "muscles of facial expression" are information about muscles involved in the movement of the face or cheek of the communication partner. FIG. 7 is a diagram illustrating an example of acquiring information about facial muscles according to the embodiment of the present disclosure. As illustrated in FIG. 7, the position information about the facial muscles of the communication partner acquired by face tracking or the like can be provided as the "muscles of facial expression" information. In this case, the position information about the facial muscles is represented in the head coordinate system.

Further, among the "vision" information illustrated in FIG. 5, the "mouth" is information indicating the shape or movement of the mouth of the communication partner.

The elements constituting the "vision" information may include Information about the appearance of the communication partner. For example, the appearance is information indicating the current appearance of the communication partner, and may include information such as a hairstyle, a makeup, and clothes. The appearance may be real-time image data or data for designating the appearance (model number of hairstyle, clothes, and the like, for example) uploaded in advance to a common database. In the case of a mode in which data for designating the appearance is uploaded, registration may be performed at an initial stage of communication for performing remote communication, or registration may be performed subsequently.

Further, the "hearing" information illustrated in FIG. 6 is sound information regarding a sound received from the communication partner by the elements of "sound" and "sound source location". For example, the "sound" corresponds to a voice uttered by the communication partner, a sound of rustling clothes of the communication partner, a motion sound generated in response to a movement of the communication partner such as a sound of shoes, and so on. Note that the voice and other sounds may be handled separately. The "sound source location" is information about a position where a sound is made. For example, in a case where the position of the communication partner such as the standing position is known, the sound source location can be set at the position and presented as a stereophonic sound.

Further, the "somatic sensation" information illustrated in FIG. 6 is information for virtually reproducing a contact with the model of the communication partner or the like by the elements of "contact", "sense of force", "sense of pressure", "tactile sense", "sense of warmth", and "air pressure". For example, the "contact" is to convey information such as the extent of a body contact. The "contact" is conveyed as a degree of the extent of a contact with the position coordinates of the body of the user U determined to have come into contact with the model of the communication partner. The degree of the extent of the contact is not necessarily conveyed.

Further, the "olfaction" information illustrated in FIG. 6 is information for virtually reproducing a smell of the communication partner, a scent of a space where the communication partner is present, or the like by the element of "smell".

In a case where the communication partner is an animal, for example, animal-specific information such as the movement of the tail may be added as the motion information.

In a case where it is intended to increase the types of the motion information to be presented to the communication partner, adjustment may be made to reduce the resolution of the motion information. Further, in accordance with the number of pieces of information to be prioritized as the motion information, for example, in a case where the number of pieces of information to be prioritized is small, adjustment may be made to increase the resolution of the motion information.

<1-3-2. Regarding Priority Order of Motion Information>

Hereinafter, the priority order to be set for the motion information will be described. For example, it is desirable to give the highest priority to the hearing information among the first motion information. That is, a sound exchanged in the remote communication is considered to be the most important element for achieving smooth remote communication. In view of this point, the priority order set for the motion information in order of priority is, for example, hearing information>visual information>somatic sensation information>olfactory information. Specifically, in a case where the motion information is arranged in order of priority, the order of sound (voice or motion sound)>position (standing position or the like)>head position and orientation>hand position>line-of-sight>facial expression>posture (pattern by a combination of elements such as chest, shoulder, and arm)>appearance>contact is exemplified.

The transmission processing unit 131 transmits the first motion information acquired by the sensor 11 and the priority order set for the first motion information from the communication unit 110 to the communication mechanism 13. The first motion information and the priority order information transmitted from the transmission processing unit 131 to the communication mechanism 13 are transmitted to a user at another point, which is a communication partner in the remote communication, through the communication mechanism 13. This reduces the influence of change in a communication band or a communication delay in the remote communication.

Further, the transmission processing unit 131 changes the priority order for transmission of the first motion information based on the degree of change in the first motion information. For example, the transmission processing unit 131 changes the priority order such that the first motion information having a large degree of change in a certain period, among the first motion information acquired by the sensor 11, is prioritized relatively. Specifically, the transmission processing unit 131 compares a value of the current first motion information acquired by the sensor 11 with a value of the previous first motion information stored in the user information storage unit 121. As a result of the comparison, the transmission processing unit 131 determines that the first motion information whose change from the value of the previous first motion information exceeds a predetermined threshold is the first motion information with high importance. As a specific example, in a case where the posture of the user U changes from a standing posture (standing position) to a sitting posture (sitting position), it is determined that the priority of the information on the sitting position is high. Then, the transmission processing unit 131 changes the priority order such that the priority order of the first motion information determined to be highly important becomes relatively high.

Further, for example, in a case where there is a plurality of pieces of first motion information having the same degree of change in a certain period among the first motion information, the transmission processing unit 131 changes the priority order such that the first motion information having a small amount of information is prioritized.

In transmitting the first motion information, the transmission processing unit 131 may adjust the resolution and transmit the resultant. Further, the transmission processing unit 131 may estimate first motion information that is not acquired based on the acquired first motion information and transmit the resultant. Further, in a case where there is a plurality of pieces of first motion information having a dependency relationship among the first motion information, the transmission processing unit 131 may make adjustment so as to avoid a gap between the priority orders of the plurality of pieces of first motion information having a dependency relationship therebetween.

<1-3-3. Regarding Neutral State>

Hereinafter, the neutral state will be described. The details of the neutral state differ depending on how to display the communication partner. For example, in using a bone model in which a line-of-sight movement, a head movement, and a whole-body movement are possible, the following neutral state is exemplified.

Examples of the neutral state of the sound include silence. Examples of the neutral state of the standing position of the communication partner include a point where the communication partner stands finally, and a rotation in the direction of the communication partner in a case where it is impossible, during a conversation, to directly face the communication partner only by rotating the position of the head.

Examples of the neutral state of the position and orientation of the head of the communication partner include a direction of the communication partner during a conversation, and other than that, the front of the body. Examples of the neutral state of the hand position of the communication partner include putting down the hand naturally and, during a conversation or moving the position of the whole-body, moving the hand in conjunction therewith.

Examples of the neutral state of the line-of-sight of the communication partner include directing the line-of-sight to the front with downcast eyes, directing the line-of-sight to the communication partner during a conversation, periodically blinking and, when the head moves, directing the line-of-sight to a direction in which the head moves.

Examples of the neutral state of the facial expression of the communication partner include showing no expression, moving the mouth in conjunction with a voice if there is a voice, and changing the opening degree of the mouth depending on the volume of the voice.

Examples of the neutral state of the posture of the communication partner include standing upright. Examples of the neutral state of the appearance of the communication partner include maintaining the current state. Examples of the neutral state of the contact of the communication partner include moving together with the hand position of the communication partner.

<1-3-4. Specific Example of Display Control>

Hereinafter, a specific example of display control executed by the presentation processing unit 134 will be described. For example, it is assumed that the second motion information acquired from the communication partner is configured with the following priority order. Further, a situation when all the pieces of the second motion information has been received is assumed as follows.

Priority order: voice>hand position>line-of-sight>facial expression>standing position>head orientation Communication speed (downlink): 3 MB (megabyte)/sec.

Update frequency of information (frame rate): 60 Hz (hertz)

It is assumed that the communication speed has changed as follows from the situation assumed as described above.

Communication speed (downlink): 1 MB (megabyte)/sec.

In the case of decrease in communication speed as described above, when the update frequency of information (frame rate) is prioritized, the communication traffic per packet is also ⅓. In light of the above, the presentation processing unit 133 changes so as to display only the voice and the hand position that are given high priority.

Further, the presentation processing unit 133 switches or complements the information regarding the line-of-sight, the facial expression, the standing position, and the head orientation that cannot be received, among the second motion information received from the communication partner, as follows.

Line-of-sight→front, or user U during utterance, hand during gesture

Facial expression→straight face→automatic identification by tone of voice

Standing position→last standing position

Head orientation→same direction as that of the line-of-sight

<1-4. Processing Procedure Example>

Figure 8:
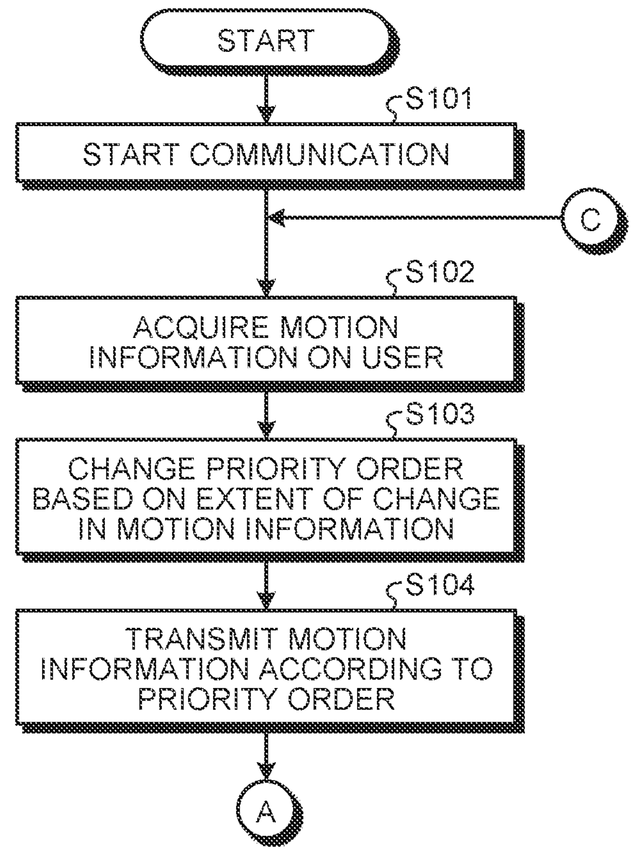
FIG. 8 is a flowchart illustrating an example of a processing procedure of an information processing device according to an embodiment of the present disclosure.

Hereinafter, a processing procedure by the information processing device 100 according to the embodiment of the present disclosure will be described with reference to FIGS. 8 and 9. FIGS. 8 and 9 are flowcharts illustrating an example of a processing procedure of an information processing device according to an embodiment of the present disclosure. The processing procedure illustrated in FIGS. 8 and 9 is executed by the control unit 130 included in the information processing device 100.

As illustrated in FIG. 8, the transmission processing unit 131 establishes communication with another point through the network N (Step S101).

Further, the transmission processing unit 131 acquires motion information on the user U from the sensor 11 (Step S102). The transmission processing unit 131 also changes the priority order for transmission of the motion information on the user U based on the extent (degree) of change in the motion information on the user U (Step S103).

Further, the transmission processing unit 131 transmits the motion information and the information about the priority order to the user at another point, who is the communication partner, according to the order of priority through the communication mechanism 13 (Step S104).

As illustrated in FIG. 9, the reception processing unit 132 receives the motion information indicating a bodily motion of the user at another point, who is the communication partner for the remote communication, through the communication unit 110 (Step S105).

The reception processing unit 132 further stores the received motion information on the communication partner in the counterpart information storage unit 122 (Step S106).

The presentation processing unit 133 sets, for display, the received motion information on the communication partner (Step S107).

Further, the presentation processing unit 133 determines whether there is change in the configuration of the motion information on the communication partner (Step S108).

If the presentation processing unit 133 determines that there is change in the configuration of the motion information on the communication partner (Step S108; Yes), then unreceived motion information is complemented with the received motion information (Step S109).

The presentation processing unit 133 also sets non-complementable motion information as the neutral state (Step S110).

Further, the presentation processing unit 133 determines whether update of the motion information on the communication partner is delayed (Step S111).

If the presentation processing unit 133 determines that the update of the motion information on the communication partner is delayed (Step S111; Yes), then it is determined whether acceleration indicating a movement of the body or the body part of the communication partner is equal to or greater than a threshold (Step S112).

If the presentation processing unit 133 determines that the acceleration indicating a movement of the body or the body part of the communication partner is equal to or greater than the threshold (Step S112; Yes), then an image of the communication partner is erased or an error indication is made (Step S113).

Further, the presentation processing unit 133 determines whether to finish the communication for the remote communication (Step S114).

If the presentation processing unit 133 determines to finish the communication for the remote communication (Step S114; Yes), then the processing procedure illustrated in FIGS. 8 and 9 is finished.

On the other hand, if the presentation processing unit 133 does not determine to finish the communication for the remote communication (Step S114; No), then the processing returns to the processing procedure of Step S102 described above.

Further, in Step S112 described above, if the presentation processing unit 133 determines that the acceleration indicating a movement of the body or the body part of the communication counterpart is less than the threshold (Step S112; No), then all the pieces of motion information are set to converge in the neutral state (Step S115).

The presentation processing unit 133 displays the image of the communication partner (Step S116), and the processing proceeds to the processing procedure of Step S114 described above.

Further, in Step S111 described above, if the presentation processing unit 133 does not determine that the update of the motion information on the communication partner is delayed (Step S111; No), then the processing proceeds to the processing procedure of Step S116 described above.

Further, in Step S108 described above, if the presentation processing unit 133 does not determine that there is change in the configuration of the motion information on the communication partner (Step S108; No), then the processing proceeds to the processing procedure of Step S111 described above.

2. Modification

<2-1. Regarding Priority Order>

In the embodiment described above, the information processing device 100 may present as many types of information as possible by reducing the resolution of each piece of information constituting the motion information on the user U. Conversely, the information processing device 100 may present a reduced number of types of information without reducing the resolution of each piece of information constituting the motion information.

The information processing device 100 may also change the priority order according to hardware constraints. For example, the information processing device 100 may lower the priority order of the motion information that requires time-consuming calculation.

Alternatively, in a case where the system environments of the communication partners are different (in a case where there is a difference in calculation performance of the devices, or the like), the information processing device 100 may give priority to motion information that can be commonly acquired in both of the system environments among the pieces of information constituting the motion information. In other words, the priority order of each piece of information constituting the motion information may be set to fit the system environment having low calculation performance.

The information processing device 100 may dynamically change the priority order of the motion information based on the action of the user U or the action of the communication partner. For example, the information processing device 100 may transmit a request for changing the priority order of the motion information on the communication partner to be received based on the action of the user U. Specifically, in a case where it is determined that the user U is about to bring the communication partner into view based on the information (acceleration of the head or the like) acquired from the sensor 11, the information processing device 100 may transmit, to the communication partner, a change request for requesting to increase the priority order of the facial expression or the line-of-sight information of the communication partner. Alternatively, in a case where the user U does not bring the communication partner into view, the information processing device 100 may request the communication partner to increase the resolution of the voice information.

The information processing device 100 may dynamically change the priority order of the motion information based on the context (context) of the communication. For example, the information processing device 100 may change the priority order according to an event of a shared content. Specifically, the information processing device 100 may perform control such that the priority order of the facial expression of the user U is increased immediately after a highlight scene of game content or between breaks of the content such as between rounds of the game content to convey a lot of information such as the facial expressions of each other.

Further, in a case where the game content on the opponent side is being shared, the information processing device 100 may perform control to convey only the game information to ensure the line speed. Further, in a case where the user U releases his/her hand from an operation device, the information processing device 100 may display information on the communication partner.

<2-2. Use of Regular Motion Pattern>

In the embodiment described above, the communication traffic may be reduced by storing, in advance, gestures (crossing arms, tilting a head, nodding, etc.), facial expressions, and the like frequently performed by the user U as regular motion patterns under each system environment. For example, in a case where the gesture or the facial expression of the user U is similar to the regular motion pattern, the information processing device 100 transmits a control signal indicating that the gesture or the facial expression corresponds to the regular motion pattern to the communication partner. In the system 10 on the communication partner side, display is made using the regular motion pattern stored in advance. Incidentally, the information processing device 100 may blend the regular motion pattern and the actual motion information together to reproduce an animation that does not give a strange feeling as the image of the communication partner.

<2-3. Conditions for Transmitting Motion Information>

In the embodiment described above, the information processing device 100 may perform control so as to transmit the motion information corresponding to a gesture to the communication partner on condition that the voice and the motion of the user U match. For example, only in a case where the user U utters "peace" and makes the V-sign with fingers, the information processing device 100 transmits motion information regarding the V-sign gesture.

<2-4. Regarding Update of Information>

Figure 10:
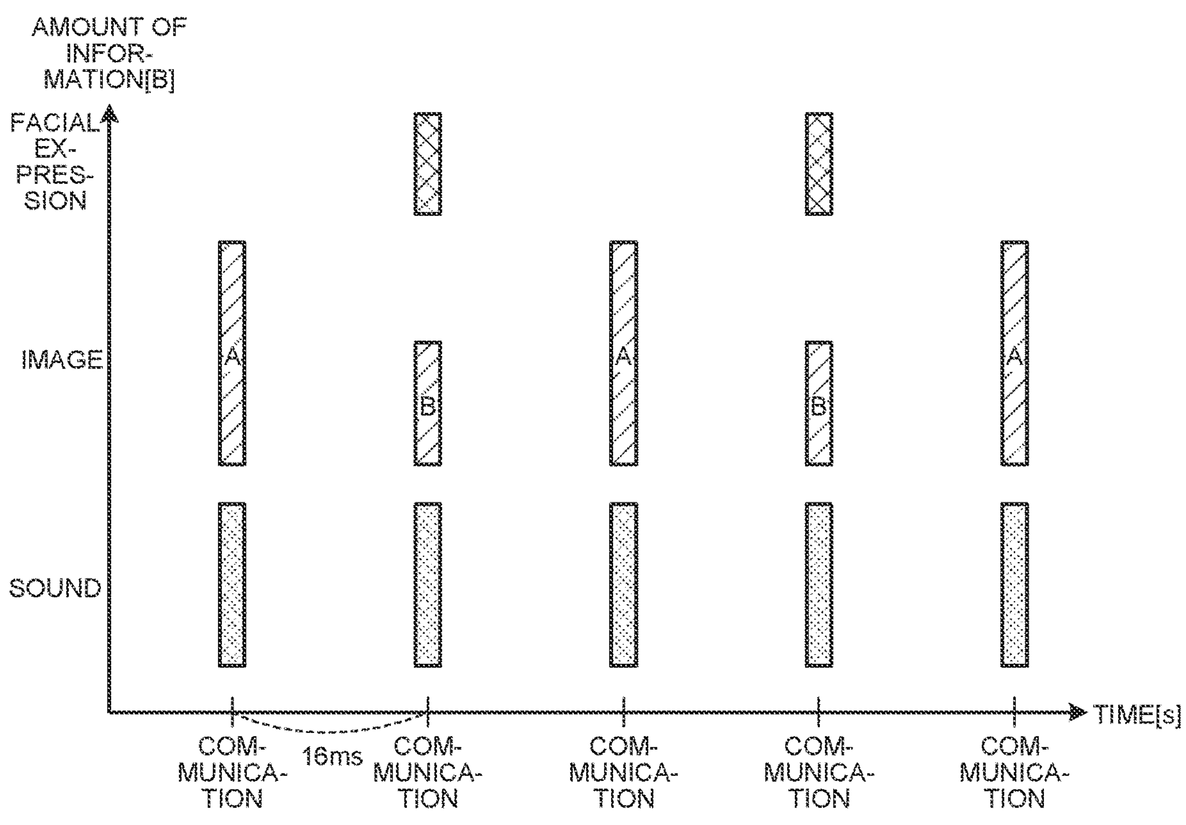
FIG. 10 is a diagram illustrating an example of an update frequency of motion information according to a modification.
Figure 11:
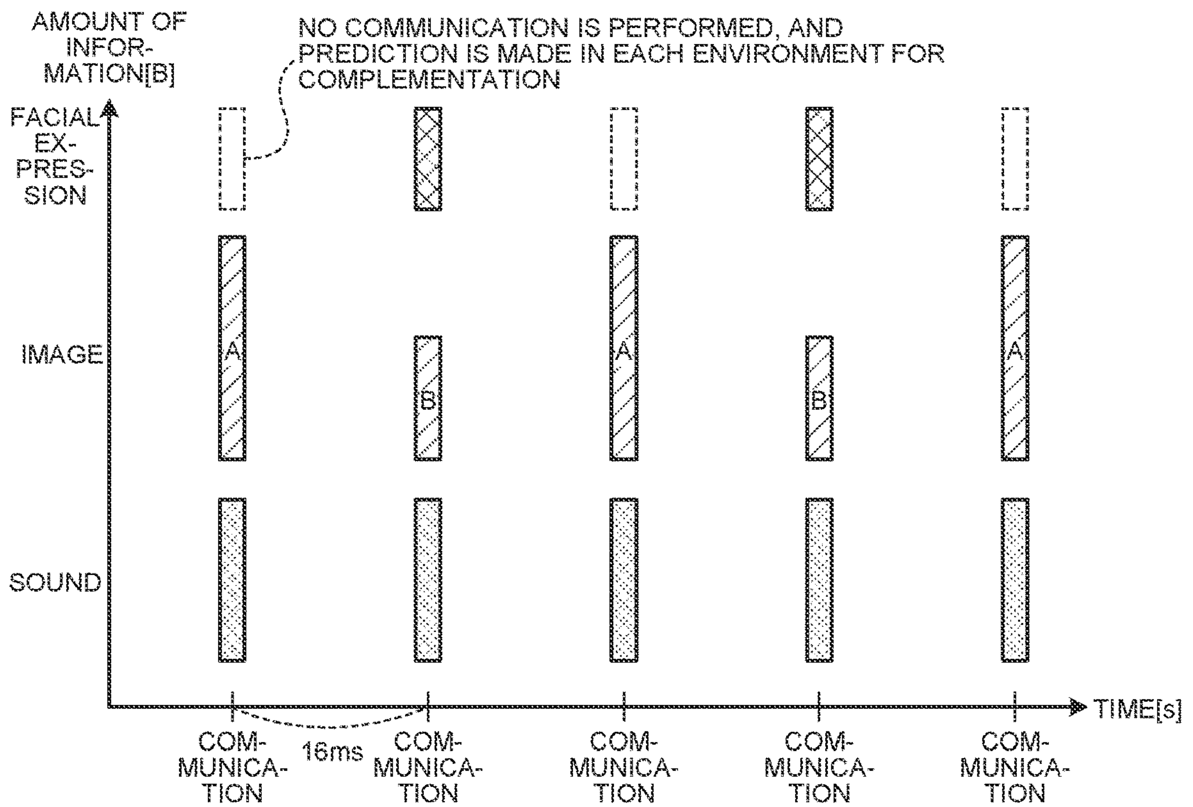
FIG. 11 is a diagram illustrating an example of an update frequency of motion information according to a modification.

In the embodiment described above, among the motion information transmitted and received between the systems 10, information having a large data amount may have a lower update frequency than that of other information. FIGS. 10 and 11 are diagrams illustrating an example of an update frequency of motion information according to a modification.

As illustrated in FIG. 10, the voice may be updated every frame. Further, as illustrated in FIG. 10, the image may be updated over a plurality of frames. Further, as illustrated in FIG. 10, the facial expression may be periodically updated at regular intervals.

At this time, as illustrated in FIG. 11, the information processing device 100 may use a prediction technology to make the facial expression of the communication partner appear to have the same update frequency as the other information. In a case where the difference between the actual motion information of the communication partner and the prediction becomes large, the information processing device 100 may significantly update the motion information while the user U is not looking at (the image of) the communication partner. The information processing device 100 may update the motion information at a moment when a conversation stops or an action stops. Further, the information processing device 100 may always update the motion information little by little independently of the context (context) of communication being made.

<2-5. Regarding Complement of Information>

In the embodiment described above, the information processing device 100 may perform the complement processing on the unreceived motion information with the received motion information at the time of reception or at the time of transmission. Further, in complementing the motion information, the information processing device 100 may estimate the expression of feeling from the gesture of the communication partner. For example, in a case where the information processing device 100 cannot receive the facial expression, an action that can be identified as an emotion, such as a specific hand movement or head movement, may be complemented as the facial expression (complement on the reception side). In a case where the information processing device 100 cannot transmit a hand movement or head movement, the information processing device 100 may transmit information on the corresponding facial expression on condition that the hand movement or head movement can be identified as the emotion of the user U (complement on the transmission side).

Further, the information processing device 100 may estimate the emotion based on the voice. The information processing device 100 may estimate the standing position of the communication partner based on the movement of the line-of-sight. At this time, the information processing device 100 may determine the line-of-sight based on eye tracking or a movement of the head. Further, the information processing device 100 may determine the posture based on the head position. The information processing device 100 may treat the position and orientation of the head as the standing position.

<2-6. Regarding Neutral State>

In the embodiment described above, when setting all the pieces of motion information to converge in the neutral state eventually (see Step S115 in FIG. 9), the information processing device 100 may notify the user U of the neutral state on purpose. The information processing device 100 may make the display of the information to be in the neutral state faint or hide the display thereof.

<2-7. Regarding Display of Communication Partner>

In the embodiment described above, the information processing device 100 may dynamically change the display method for displaying the communication partner depending on the bandwidth used for communication. For example, as described below, a display method with a larger data amount can be selected as the bandwidth is wider.

Example: Real-time three-dimensional image>three-dimensional avatar (live-action or animation)>two-dimensional image>two-dimensional icon>sound only Further, the information processing device 100 may change the motion information on the communication partner depending on the method for displaying the communication partner. Further, the avatar used for displaying the communication partner may be any model, not a human type.

Further, when reproducing and displaying a position newly updated from the position in the neutral state, the information processing device 100 may perform complement processing to perform control such that the communication partner is gradually displayed. For example, the information processing device 100 can perform the complement processing using an average value from a previous value or a weighted average value.

Further, the information processing device 100 may change the transparency of the avatar depending on the degree of communication. For example, it is conceivable that the information processing device 100 causes an avatar of a communication partner with a worse communication status to be in a ghost state or to have a smaller sound.

Further, the information processing device 100 may uniquely predict a reaction pattern of the communication partner in the system environment on the user side to complement the motion information on the communication partner. This can reduce the feeling of delay felt by the user U.

In addition, in a case where the communication partner displayed in AR moves to a physically impossible position in the region where the user U is located, the information processing device 100 may ignore the real object for display. Alternatively, the information processing device 100 may turn off the display for the communication partner and notify the communication partner by UI, sound, or the like. In the notification, in a case where a stereophonic sound is used, the signal may be switched to a monophonic signal. Alternatively, the information processing device 100 may finish the AR space to switch to a VR space for display.

3. Others

Various programs for achieving the information processing method (see FIGS. 8 and 9, for example) executed by the information processing device 100 according to the embodiment of the present disclosure and the modification thereto may be stored in a computer-readable recording medium such as an optical disk, a semiconductor memory, a magnetic tape, or a flexible disk, and distributed. At this time, the information processing device according to the embodiment of the present disclosure can implement the information processing method according to the embodiment of the present disclosure by installing and executing the various programs on a computer.

In addition, the various programs for achieving the information processing method (see FIGS. 8 and 9, for example) executed by the information processing device 100 according to the embodiment of the present disclosure and the modification thereto may be stored in a disk device included in a server on a network such as the Internet and may be downloaded to the computer. Further, functions provided by the various programs for achieving the information processing method executed by the information processing device 100 according to the embodiment of the present disclosure and the modification thereto may be implemented in cooperation with the OS and the application program. In such a case, a portion other than the OS may be stored in a medium and distributed, or the portion other than the OS may be stored in an application server and downloaded to the computer.

Among the processing described in the embodiment of the present disclosure and the modification thereto, all or a part of the processing, described as automatic processing, can be performed manually, or all or a part of the processing, described as manual processing, can be performed automatically by a known method. In addition, the processing procedures, specific names, and information including various data and parameters indicated in the document and the drawings can be arbitrarily changed unless otherwise specified. For example, various types of information illustrated in the drawings are not limited to the illustrated information.

Further, the constituent elements of the information processing device 100 according to the embodiment of the present disclosure and the modification thereto are functionally conceptual and are not necessarily configured as illustrated in the drawings. For example, the transmission processing unit 131 included in the information processing device 100 may be one functional unit functionally integrated with the transmission order determining unit 131*a* and the transmission information encrypting unit 131*b*. Further, the reception processing unit 132 may be one functional unit functionally integrated with the counterpart information decoding unit 132*c*. The presentation processing unit 133 may be one functional unit functionally integrated with the counterpart information complementing unit 133*d* and the display information generating unit 133*e*.

Further, the embodiment of the present disclosure and the modification thereto described above can be appropriately combined to the extent that the processing contents do not contradict each other. Further, the order of the steps illustrated in the flowcharts according to the embodiment of the present disclosure can be changed as appropriate.

Although the embodiment of the present disclosure and the modification thereto have been described above, the technical scope of the present disclosure is not limited to the foregoing embodiment and the modification, and various modifications can be made without departing from the gist of the present disclosure. In addition, constituent elements of different embodiments and modification examples may be appropriately combined.

4. Hardware Configuration Example

Figure 12:
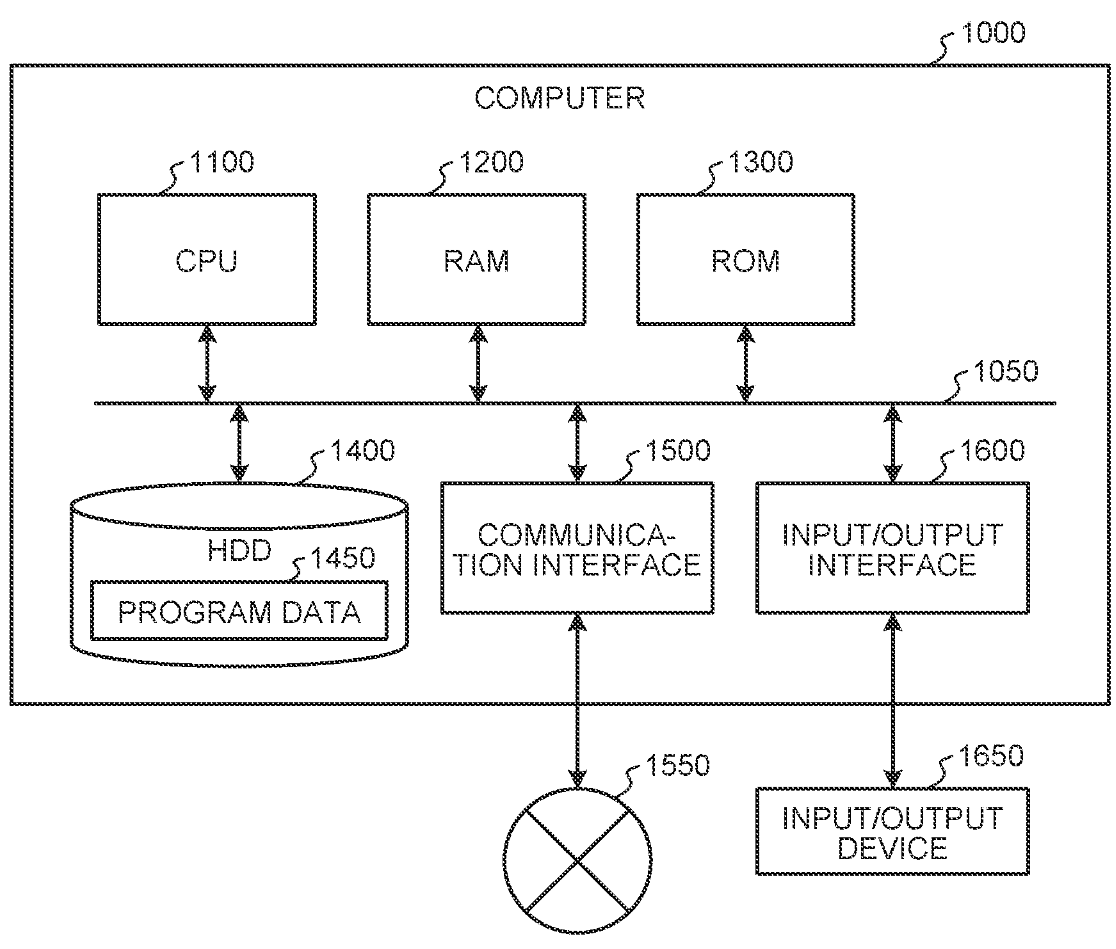
FIG. 12 is a block diagram illustrating an example of the hardware configuration of a computer corresponding to an information processing device according to an embodiment of the present disclosure and a modification thereto.

An example of the hardware configuration of a computer corresponding to the information processing device 100 according to the embodiment of the present disclosure and the modification thereto will be described with reference to FIG. 12. FIG. 12 is a block diagram illustrating an example of the hardware configuration of a computer corresponding to an information processing device according to the embodiment of the present disclosure and the modification thereto. Note that FIG. 12 illustrates an example of the hardware configuration of the computer corresponding to the information processing device according to the embodiment of the present disclosure, and the hardware configuration thereof is not necessarily limited to the configuration illustrated in FIG. 12.

As illustrated in FIG. 9, a computer 1000 corresponding to the information processing device 20 according to the embodiment of the present disclosure includes a central processing unit (CPU) 1100, a random access memory (RAM) 1200, a read only memory (ROM) 1300, a hard disk drive (HDD) 1400, a communication interface 1500, and an input/output interface 1600. The units of the computer 1000 are connected to one another by a bus 1050.

The CPU 1100 operates on the basis of a program stored in the ROM 1300 or the HDD 1400 to control the units. For example, the CPU 1100 expands a program stored in the ROM 1300 or the HDD 1400 into the RAM 1200, and executes processing corresponding to various programs.

The ROM 1300 stores a boot program such as a basic input output system (BIOS) executed by the CPU 1100 at the start of the computer 1000, a program that depends on the hardware of the computer 1000, and the like.

The HDD 1400 is a computer-readable recording medium that non-transiently records a program executed by the CPU 1100, data used by the program, and the like. Specifically, the HDD 1400 records program data 1450. The program data 1450 is an example of an information processing program for implementing the information processing method according to the embodiment and data used in the information processing program.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting an input/output device 1650 to the computer 1000. For example, the CPU 1100 receives data from an input device such as a keyboard and a mouse via the input/output interface 1600. The CPU 1100 also transmits data to an output device such as a display device, a speaker, or a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the information processing device 100 according to the embodiment, the CPU 1100 of the computer 1000 executes the information processing program loaded onto the RAM 1200 to implement the various processing functions executed by the units of the control unit 130 illustrated in FIG. 4.

That is, the CPU 1100, the RAM 1200, and the like implement the information processing by the information processing device 100 according to the embodiment of the present disclosure in cooperation with software (information processing program loaded onto the RAM 1200).

5. Conclusion

The information processing device 100 according to the embodiment of the present disclosure and the modification thereto includes the transmission processing unit 131, the reception processing unit 132, and the presentation processing unit 133. In the remote communication performed between a plurality of points distant from each other, the transmission processing unit 131 transmits the first motion information indicating a bodily motion of a user to a user at another point. The reception processing unit 132 receives the second motion information indicating a bodily motion of the user at another point. In presenting information in which a situation of the user at another point is reproduced based on the second motion information, the presentation processing unit 133 controls the display content based on a situation in which the second motion information is acquired. This enables the information processing device 100 to display an image that does not give a strange feeling or unnaturalness to the user, leading to smooth remote communication.

In the embodiment of the present disclosure and the modification thereto, in a case where the configuration of the second motion information changes, the presentation processing unit 133 controls the display content. This enables the information processing device 100 to perform adjustment so that the image of the communication partner does not give a strange feeling or unnaturalness to the user.

Further, in the embodiment of the present disclosure and the modification thereto, in a case where the number of types of the second motion information is reduced, the presentation processing unit 133 complements unreceived motion information by using the received motion information. This enables the information processing device 100 to perform adjustment so that the image of the communication partner does not give a strange feeling or unnaturalness to the user even if the motion information on the communication partner is partly missing.

Further, in the embodiment of the present disclosure and the modification thereto, in a case where the unreceived second motion information cannot be complemented by using the received second motion information, the presentation processing unit 133 sets the second motion information that cannot be complemented as preset information. This enables the information processing device 100 to perform adjustment so that the image of the communication partner does not give a strange feeling or unnaturalness to the user even if the motion information on the communication partner cannot be complemented.

Further, in the embodiment of the present disclosure and the modification thereto, in a case where a reception interval of the second motion information is longer than a predetermined update interval of the second motion information, the presentation processing unit 133 controls the display content. This enables the information processing device 100 to perform adjustment so that the image of the communication partner does not give a strange feeling or unnaturalness to the user even if a communication delay occurs.

Further, in the embodiment of the present disclosure and the modification thereto, before and after the information is updated, the presentation processing unit 133 erases an image display of the user at another point in which the second motion information having a degree of movement of the second motion information greater than or equal to a predetermined threshold is reproduced, or changes the image display to an error indication. This enables the information processing device 100 to prevent a situation in which the image of the communication partner does not give a strange feeling or unnaturalness to the user even if a communication delay occurs.

Further, in the embodiment of the present disclosure and the modification thereto, before and after the information is updated, in a case where the degree of movement of the second motion information is less than the predetermined threshold, the presentation processing unit 133 sets the image display of the user at another point in which the second motion information is reproduced as the preset information. This enables the information processing device 100 to perform adjustment so that the image of the communication partner does not give a strange feeling or unnaturalness to the user even if a communication delay occurs.

Further, in the embodiment of the present disclosure and the modification thereto, the transmission processing unit 131 sets a priority order that can be dynamically changed with respect to the first motion information, and preferentially transmits the first motion information given a high priority order to the user at another point. This enables the information processing device 100 to selectively provide information useful for smooth remote communication to the communication partner.

Further, in the embodiment of the present disclosure and the modification thereto, the transmission processing unit 131 changes the priority order based on the degree of change in the first motion information. This enables the information processing device 100 to provide the communication partner with useful information matching the real-time situation of the user for smooth remote communication.

Further, in the embodiment of the present disclosure and the modification thereto, the transmission processing unit 131 changes the priority order such that the first motion information having a large degree of change in a certain period is prioritized. This enables the information processing device 100 to provide the communication partner with useful information that is frequently used by the user for smooth remote communication.

Further, in the embodiment of the present disclosure and the modification thereto, in a case where there is a plurality of pieces of first motion information having the same degree of change in a certain period, the transmission processing unit 131 changes the priority order such that the first motion information having a small amount of information is prioritized. This enables the information processing device 100 to take a measure in advance so as to reduce the influence when the communication speed decreases.

The effects described in the present specification are merely illustrative or exemplary, and are not restrictive. That is, the technology according to the present disclosure can exhibit other effects obvious to those skilled in the art from the description of the present specification together with or instead of the above effects.

Note that the technology of the present disclosure can also have the following configurations as belonging to the technical scope of the present disclosure.

(1)

An information processing device comprising:

a transmission processing unit configured to transmit, in remote communication performed between a plurality of points distant from each other, first motion information indicating a bodily motion of a user to a user at another point;

a reception processing unit configured to receive second motion information indicating a bodily motion of the user at said another point; and a presentation processing unit configured to control, in presenting information in which a situation of the user at said another point is reproduced based on the second motion information, presentation content based on a situation in which the second motion information is acquired.

(2)

The information processing device according to (1), wherein the presentation processing unit controls the presentation content in a case where a configuration of the second motion information changes.

(3)

The information processing device according to (2), wherein the presentation processing unit complements, in a case where a number of types of the second motion information is reduced, the second motion information that has not yet been received by using the second motion information that has been received.

(4)

The information processing device according to (3), wherein the presentation processing unit sets, in a case where the second motion information that has not yet been received cannot be complemented by using the second motion information that has been received, the second motion information that cannot be complemented as preset information.

(5)

The information processing device according to (1), wherein the presentation processing unit controls the presentation content in a case where a reception interval of the second motion information is longer than a predetermined update interval of the second motion information.

(6)

The information processing device according to (5), wherein the presentation processing unit, before and after information is updated, erases an image display in which a situation of the user at said another point having a degree of movement of the second motion information greater than or equal to a predetermined threshold is reproduced, or, alternatively, changes the image display to an error indication.

(7)

The information processing device according to (5), wherein the presentation processing unit, before and after information is updated, sets an image display in which a situation of the user at said another point is reproduced as preset information in a case where a degree of movement of the second motion information is less than a predetermined threshold.

(8)

The information processing device according to any one of (1) to (7), wherein the transmission processing unit sets a priority order that can be dynamically changed with respect to the first motion information, and preferentially transmits the first motion information given a high priority order to the user at said another point.

(9)

The information processing device according to (8), wherein the transmission processing unit changes the priority order based on a degree of change in the first motion information.

(10)

The information processing device according to (9), wherein the transmission processing unit changes the priority order such that the first motion information having a large degree of change in a certain period is prioritized.

(11)

The information processing device according to (9), wherein the transmission processing unit changes the priority order such that, in a case where there is a plurality of pieces of the first motion information having a same degree of change in a certain period, the first motion information having a small amount of information is prioritized.

(12)

An information processing method comprising:

transmitting, by a computer, in remote communication performed between a plurality of points distant from each other, first motion information indicating a bodily motion of a user to a user at another point;

receiving, by the computer, second motion information indicating a bodily motion of the user at said another point; and controlling, by the computer, in presenting information in which a situation of the user at said another point is reproduced based on the second motion information, presentation content based on a situation in which the second motion information is acquired.

(13)

An information processing program for use in a computer, the information processing program letting the computer function as a control unit executing processing comprising:

transmitting, in remote communication performed between a plurality of points distant from each other, first motion information indicating a bodily motion of a user to a user at another point;

receiving second motion information indicating a bodily motion of the user at said another point; and controlling, in presenting information in which a situation of the user at said another point is reproduced based on the second motion information, presentation content based on a situation in which the second motion information is acquired.

REFERENCE SIGNS LIST

1 INFORMATION PROCESSING SYSTEM
11 SENSOR
12 DISPLAY MECHANISM
13 COMMUNICATION MECHANISM
100 INFORMATION PROCESSING DEVICE
110 COMMUNICATION UNIT
120 STORAGE UNIT
121 USER INFORMATION STORAGE UNIT
122 COUNTERPART INFORMATION STORAGE UNIT
130 CONTROL UNIT
131 TRANSMISSION PROCESSING UNIT
131*a* TRANSMISSION ORDER DETERMINING UNIT
131*b* TRANSMISSION INFORMATION ENCRYPTING UNIT
132 RECEPTION PROCESSING UNIT
132*c* COUNTERPART INFORMATION DECODING UNIT
133 PRESENTATION PROCESSING UNIT
133*d* COUNTERPART INFORMATION COMPLEMENTING UNIT
133*e* DISPLAY INFORMATION GENERATING UNIT

The invention claimed is:

1. An information processing device, comprising:

a processor configured to:

set a priority order for each of a plurality of pieces of information of first motion information, wherein the first motion information is of a first user, the plurality of pieces of information of the first motion information includes hearing information, visual information, somatic sensation information, and olfactory information, the hearing information includes a sound of the first user, the priority order is in an order of priority of the hearing information, the visual information, the somatic sensation information, and the olfactory information, the hearing information has a highest priority in the priority order, and the olfactory information has a lowest priority in the priority order;

transmit, in remote communication, based on the priority order, the first motion information of the first user to a second user, wherein the remote communication corresponds to a communication between a first point associated with the first user and a second point associated with the second user, and the first point is at a specific distance from the second point;

receive second motion information indicating a bodily motion of the second user;

acquire presenting information based on the received second motion information, wherein the acquired presenting information indicates a first situation of the second user at a specific time;

determine a change in a configuration of the second motion information based on the acquired presenting information;

determine a reduction in a number of pieces of the second motion information of the second user, based on the determined change in the configuration;

determine a first part of the second motion information as first missing second motion information in the second motion information, wherein the determination of the first part of the second motion information is based on the determined reduction in the number of pieces of the second motion information;

complement the first missing second motion information based on the received second motion information; and control presentation content based on the complemented first missing second motion information and the received second motion information.

2. The information processing device according to claim 1, wherein the processor is further configured to:

determine, based on the received second motion information, second missing second motion information of the second motion information is non-complementable, and set the second missing second motion information as preset information, based on the determination that the second missing second motion information is non-complementable.

3. The information processing device according to claim 1, wherein the processor is further configured to:

determine a delay in a reception of the second motion information, wherein the delay is greater than a specific update interval; and control the presentation content, based on the determined delay in the reception of the second motion information.

4. The information processing device according to claim 3, wherein the second motion information has a degree of movement greater than or equal to a specific threshold, and the processor is further configured to:

update the second motion information based on the specific update interval; and prior to and subsequent to the update of the second motion information, one of:

erase an image display of the second user based on the second motion information that has the degree of movement greater than or equal to the specific threshold, or change the image display to an error indication.

5. The information processing device according to claim 3, wherein the second motion information has a degree of movement less than a specific threshold, and the processor is further configured to:

update the second motion information based on the specific update interval; and prior to and subsequent to the update of the second motion information, set, based on the second motion information that has the degree of movement less than the specific threshold, an image display in which a second situation of the second user is reproduced as preset information.

6. The information processing device according to claim 1, wherein the processor is further configured to change the set priority order based on a degree of change in the first motion information.

7. The information processing device according to claim 6, wherein the processor is further configured to change the set priority order of the first motion information to prioritize a piece of information of the plurality of pieces of information, and the piece of information has a specific degree of change in a specific period.

8. The information processing device according to claim 6, wherein the processor is further configured to change, based on the plurality of pieces of information of the first motion information having a same degree of change in a specific period, the priority order of a piece of information of the plurality of pieces of information to prioritize the piece of information, and the piece of information has a specific amount of information.

9. An information processing method, comprising:

setting a priority order for each of a plurality of pieces of information of first motion information, wherein the first motion information is of a first user, the plurality of pieces of information of the first motion information includes hearing information, visual information, somatic sensation information, and olfactory information, the hearing information includes a sound of the first user, the priority order is in an order of priority of the hearing information, the visual information, the somatic sensation information, and the olfactory information, the hearing information has a highest priority in the priority order, and the olfactory information has a lowest priority in the priority order;

transmitting, in remote communication, based on the priority order, the first motion information of the first user to a second user, wherein the remote communication corresponds to a communication between a first point associated with the first user and a second point associated with the second user, and the first point is at a specific distance from the second point;

receiving second motion information indicating a bodily motion of the second user;

acquiring presenting information based on the received second motion information, wherein the acquired presenting information indicates a first situation of the second user at a specific time;

determining a change in a configuration of the second motion information based on the acquired presenting information;

determining a reduction in a number of pieces of the second motion information of the second user, based on the determined change in the configuration;

determining a first part of the second motion information as first missing second motion information in the second motion information, wherein the determination of the first part of the second motion information is based on the determined reduction in the number of pieces of the second motion information;

complementing the first missing second motion information based on the received second motion information; and controlling presentation content based on the complemented first missing second motion information and the received second motion information.

10. A non-transitory computer-readable medium having stored thereon, computer-executable instructions which, when executed by a processor, cause the processor to execute operations, the operations comprising:

setting a priority order for each of a plurality of pieces of information of first motion information, wherein the first motion information is of a first user, the plurality of pieces of information of the first motion information includes hearing information, visual information, somatic sensation information, and olfactory information, the hearing information includes a sound of the first user, the priority order is in an order of priority of the hearing information, the visual information, the somatic sensation information, and the olfactory information, the hearing information has a highest priority in the priority order, and the olfactory information has a lowest priority in the priority order;

transmitting, in remote communication, based on the priority order, the first motion information of the first user to a second user, wherein the remote communication corresponds to a communication between a first point associated with the first user and a second point associated with the second user, and the first point is at a specific distance from the second point;

receiving second motion information indicating a bodily motion of the second user;

acquiring presenting information based on the received second motion information, wherein the acquired presenting information indicates a first situation of the second user at a specific time;

determining a change in a configuration of the second motion information based on the acquired presenting information;

determining a reduction in a number of pieces of the second motion information of the second user, based on the determined change in the configuration;

determining a first part of the second motion information as first missing second motion information in the second motion information, wherein the determination of the first part of the second motion information is based on the determined reduction in the number of pieces of the second motion information;

complementing the first missing second motion information based on the received second motion information; and controlling presentation content based on the complemented first missing second motion information and the received second motion information.

* * * * *